United States Patent
Matsumoto et al.

(10) Patent No.: US 6,678,720 B1
(45) Date of Patent: Jan. 13, 2004

(54) CHAT SYSTEM AND METHOD FOR DELIVERING ADDITIONAL INFORMATION VIA ANOTHER INDEPENDENT NETWORK

(75) Inventors: Tatsuro Matsumoto, Kawasaki (JP); Noboru Iwayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/546,393

(22) Filed: Apr. 10, 2000

(30) Foreign Application Priority Data

Jul. 29, 1999 (JP) .......................................... 11-214800

(51) Int. Cl.⁷ ............................................. G06F 15/16
(52) U.S. Cl. ....................... 709/204; 709/205; 709/206; 709/203
(58) Field of Search ................................ 709/203, 204, 709/205, 206

(56) References Cited

U.S. PATENT DOCUMENTS

| | | | | |
|---|---|---|---|---|
| 5,916,302 A | * | 6/1999 | Dunn et al. .................. | 709/204 |
| 5,987,503 A | * | 11/1999 | Murakami ................... | 709/204 |
| 6,038,296 A | * | 3/2000 | Brunson et al. ........ | 379/100.11 |
| 6,167,426 A | * | 12/2000 | Payne et al. ................. | 709/200 |
| 6,366,948 B1 | * | 4/2002 | Teibel ......................... | 709/204 |
| 6,446,130 B1 | * | 9/2002 | Grapes ........................ | 709/231 |
| 6,484,196 B1 | * | 11/2002 | Maurille ..................... | 709/206 |
| 2002/0186244 A1 | * | 12/2002 | Matsuda et al. ............ | 345/757 |

* cited by examiner

Primary Examiner—Wen-Tai Lin
(74) Attorney, Agent, or Firm—Staas & Halsey LLP

(57) ABSTRACT

Messaging system and device for enabling users simultaneously and directly to send messages to numerous persons in cases where the users cannot connect directly to a chat system. A message is received by messaging device 1 from access device 2, which is a telephone set for example, and is stored in message database 3 as is without further processing. In addition to the message, messaging device 1 also receives a message destination designation from access device 2. Messaging device 1 reports a storing location for the message on an IRC, a URL for example, by sending a text message to the message destination. The IRC client notifies the user of the text message in real time. A user who views the text message makes a request to provider device 4 to provide the message using acquisition device 8. Provider device 4 accesses the message database, reads the message, and sends it to the acquisition device 8. Thereby, the message sent from access device 2 is reported as is to another user.

8 Claims, 6 Drawing Sheets

Fig.3

| NICKNAME | AUTHENTICATION INFORMATION ||
|          | USER ID | PASSWORD |
|----------|---------|----------|
| USER-A   | *****   | USER-A   |
| ⋮        | ⋮       |          |

Fig.4

| SEND DESTINATION | URL | SEND SOURCE |
|------------------|-----|-------------|
| #CH1             | URL1 | USER-A     |
| USER-A           | URL2 | USER-B     |
| ⋮                | ⋮    | ⋮          |

CHAT SYSTEM AND METHOD FOR DELIVERING ADDITIONAL INFORMATION VIA ANOTHER INDEPENDENT NETWORK

BACKGROUND OF THE INVENTION

1. Technical Field

The present invention relates to chat systems enabling text-based conversation, wherein a plurality of users connected to a network share virtual spaces set up on the network. The present invention more particularly relates to technology for using a chat system to promote smooth communication.

In the present invention, the chat system comprises a plurality of chat devices. The chat devices are connected to the network, share a virtual conversation space set up virtually on the network, and send and received text messages to one another in a conversational format.

IRC (Internet Relay Chat) system is one type of chat system constructed in compliance with the IRC protocol. An IRC system is constituted by the connection of IRC servers and IRC clients via the Internet and the like. The IRC client shares a virtual space, called a channel, and sends and receives text messages in real time. The IRC server broadcasts messages to the IRC clients that share the same channel. In an IRC system, each IRC client is uniquely designated by an identifier called a nickname.

2. Description of Related Art

With the rapid diffusion of the Internet in recent years, IRC has become widely known as a chat system. In an IRC system, a user can join a plurality of channels. In addition, a user can view conversations in a plurality of channels which the user has joined and can also send messages to a channel to participate in the channel.

The diffusion of the Internet has brought about an increase in opportunities for users at offices positioned at remote locations to coordinate their work. For example, a work style wherein geographically separated members of one department join a ordinarily designated channel, thereby exchanging information and promoting mutual understanding of their intentions, is becoming commonplace. In such a working environment, it is critical to perform work on the basis of an understanding that information is shared. Chat systems, such as an IRC system, are suited as communication tools for building that understanding by sharing information in real time.

By using a chat system as discussed above, it is possible to share information and promote mutual understanding of intentions even while being geographically separated. However, this is strictly limited to cases wherein the users can connect to a chat system; otherwise, these advantages cannot be enjoyed.

Considering an example wherein a certain user at the destination of a business trip wants to contact all members of a group, if it is possible to connect to a chat system, the user can directly convey informational matter to all members of the group by connecting to the chat system and dispatching the matter to the virtual space for the relevant group. However, if it is not possible to connect to a chat system, directly conveying the matter to all of the members is difficult.

Presently, the following methods are conceivable in the case wherein it is desired to convey the same matter to a plurality of members:

(A) The user telephones from his destination to his usual location, and requests the person who takes the call to dispatch a message to the channel on his behalf.

(B) The user leaves a message using by dialing a predetermined telephone number and recording a message, and has those persons belonging to the same department periodically access the service.

(C) The user uses the short message function of a portable telephone to send a message via a mailing list, which can simultaneously distribute electronic mail to numerous persons.

However, methods (A) to (C) above have the following problems:

(A) Since the message can only be conveyed indirectly, there is the uncertainty about whether the nuance one truly wishes to convey is reliably conveyed to all members.

(B) Since persons belonging to the same department are obliged periodically to access the telephone number, this method is troublesome as well as impractical because the message is not conveyed if those persons forget to access the service. In addition, the message is not conveyed in real time.

(C) The amount of information that can be conveyed is small. In addition, operation is complicated if one tries to convey a large amount of information. Furthermore, the message is not conveyed until the other party views the electronic mail.

In other words, a means has not yet been provided that can easily and in real time convey a message to a plurality of users on a chat system when it is not possible to connect to the chat system.

SUMMARY OF THE INVENTION

An object of the present invention is to provide technology enabling use of a chat system to convey messages in real time directly to a plurality of users on the chat system, even wherein direct connection to the chat system is not possible.

To solve the foregoing problems, in the present application the invention in a first aspect provides a messaging method used in a chat system comprising chat devices connected to a network that share a conversation space set up virtually on the network and that send and receive text to one another in a conversational format, wherein the messaging method (A) receives, from an information terminal having a communications function independent of the chat system, communication data and data that designates the virtual space or one of the chat devices, via the communications function;

(B) stores the received data; and (C) notifies the designated virtual space or one of the chat devices of the storage location of the data via the chat system.

If IRC, for example, is used as the chat system, then the network is the Internet. As an information terminal having a communications function independent of the chat system, an ordinary information terminal like, for example, a telephone set or fax machine on a telephone circuit network, or a PC (personal computer) independent of the Internet can be used. The other terminal that is the second information terminal, whereon an IRC client or IRC server can run, has a communications function for receiving data from the information terminal. The second information terminal receives voice data, image data, text data and the like from the information terminal via the communications function. The second information terminal stores the received data, and notifies via the chat system the conversation space or a specific user of the address of the storage location. A URL (uniform resource locator), for example, can be used as the address.

The user notified of the URL can access the message using an ordinary method. For example, if the user is notified of a URL by an IRC client, the user can access the URL using a browser. The WWW (World Wide Web) server that receives this access request sends the contents of the URL to the user terminal.

The present invention second in a second aspect configures a messaging system used together with a chat system comprising chat devices connected to a network that share a conversation space set up virtually on the network and that send and receive text to one another in a conversational format. This messaging system is provided with a storage means, and a second information terminal.

The storage means is directly connected to the network or is connected to the network via a device connected to the network, and can store data.

The second information terminal receives, from a first information terminal having a communications function independent of the chat system, communication data and data that designates the virtual space or one of the chat devices, via the communications function; and stores the received communication data in the storage means. Furthermore, the second information terminal notifies the designated virtual space or one of the chat devices of the storage location of the communication data via the chat system.

Considering an example in which IRC is used as the chat system, a Web page is used as the storage means, and a telephone is used as the first information terminal. User A uses the telephone set to place a call to the second information terminal, and sends a message by voice designating, for example, channel #CH1. The second information terminal stores the message as is on the Web page designated by "URL1."

Furthermore, the second information terminal uses IRC protocol to notify channel #CH1 of "URL1." The plurality of users participating in channel #CH1 can listen to the on-air voice of user A by accessing the reported "URL1" with an appropriate browser. Accordingly, even when it is not possible to connect to an IRC system, raw data can be sent to numerous persons in real time.

The invention in the present application in a third aspect configures a messaging device used together with a chat system comprising chat devices connected to a network that share a conversation space set up virtually on the network and that send and receive text to one another in a conversational format. This messaging device is provided with an external communication means, target switching means, storing means and notification means.

The external communication means receives, from a first information terminal having a communications function independent of the chat system, voice data, text data or image data via the communications function.

The target switching means receives from the first information terminal via the communications function the designation of the virtual space or one of the chat devices.

The storing means stores the received data at a location directly connected to the network or at a location connected to the network via a device connected to the network.

The notification means notifies the designated virtual space or one of the chat devices via the chat system of the storage location of the data.

The messaging device of the invention in this aspect corresponds to the second information terminal of the second invention. To illustrate using the same example given in describing the second aspect of the invention, the external communication means is connected to a telephone circuit and can receive voice data. The target switching means sends a message prompting the telephone set, for example, to input the destination, and acquires the inputted destination. The destination is selected from a channel or one of the IRC clients. The storing means can store the voice data from the telephone set as data under the management of the WWW server. The notification means notifies via the IRC server or IRC client the destination acquired by the target switching means of the URL of the Web page wherein the voice data is stored.

Furthermore, the data received from the first information terminal and then stored is not limited to voice data. For example, if the first information terminal is a fax machine, the messaging device receives image data from the first information terminal and stores it on the Web page. In addition, if the first information terminal is a portable information terminal that does not have a chat device, the messaging device receives text data and stores it on the Web page. In this case, for example, although the first information terminal does not have an IRC client, it can send and receive electronic mail.

The present invention in a fourth aspect configures the messaging device according to the invention in its third aspect, and is provided with a authentication information storage means and a authentication means.

The authentication information storage means stores predetermined authentication information for each user.

The authentication means authenticates a user by making a request to the first information terminal for predetermined authentication information and compares the inputted authentication information to the stored authentication information.

Passwords, user identification numbers, and user voice data can be cited as examples of authentication information. Authenticating the user by using the authentication means can prevent leakage of messages from exchanges between designated users from being leaked to a third party.

The present invention in a fifth aspect configures the messaging device according to the third aspect, and is provided with a message storage means, a conversation acquisition means and a conversion means.

The message storage means stores for each virtual space the message history of the virtual space.

The conversation acquisition means acquires a message in the virtual space from the chat device and stores it in the message storage means.

The conversion means, when the target switching means has received a virtual space designation, acquires from the message storage means the message history of the designated virtual space and converts it to a format suited to the first information terminal.

For example, the conversation acquisition means via the IRC client creates message histories for virtual spaces, and stores them in the message storage means. If the target switching means acquires the designation of a channel from a telephone set, the conversion means acquires from the message storage means the message history of the designated channel. Subsequently, the conversion means converts the message history, which is text data, to voice data, plays back the voice and sends it to the telephone set. If the first information terminal is a fax machine, the conversion means converts the message history to image data and sends it. The conversation in a channel can thus be acquired using an external information terminal, even if the user cannot connect directly to a chat system.

In the present application the invention in a sixth aspect configures the messaging device according to the invention in its third aspect, and is provided with a message table, a recorded message monitoring means and a recorded message notification means.

The message table associates and stores the send destination, send source and storage location of the data.

The recorded message monitoring means, if a virtual space is designated by the first information terminal, determines based on the message table whether data from another first information terminal addressed to the designated virtual space is stored. Furthermore, the recorded message monitoring means also determines based on the message table whether data from another first information terminal addressed to the first information terminal is stored.

The recorded message notification means, in accordance with the determination results, sends the stored data from the other first information terminal to the first information terminal.

For example, the message table stores "USER-A" as the send destination, "USER-B" as the send source and "URL1" as the storage location. If "USER-A" accesses the messaging device by a telephone set and designates channel #CH1, the messaging device performs the following operation.

First, the recorded message monitoring means searches the message table for messages addressed to "USER-A" and messages addressed to channel #CH1. In this case, messages whose send source is "USER-A" are excluded. If a message addressed to "USER-A" is found as a result of the search, the recorded message monitoring means notifies the recorded message notification means of the storage location of the message. The recorded message notification means retrieves, for example, voice data from the storage location and sends it to the telephone set of "USER-A." Thereby, the data sent to a user by another user can be acquired outside of the chat system. In addition, the data from another user to a designated channel can be obtained outside of the chat system.

The present invention in a seventh aspect provides a computer readable recording medium whereon is recorded a messaging program for executing steps A to D below, used in information terminals connected to a network that share a conversation space set up virtually on the network, and that can send and receive text to one another in a conversational format.

(A) a step of receiving from a first information terminal having a communications function independent of the chat system, voice data, text data or image data via the communications function;

(B) a step of receiving from a one information terminal via the communications function designation of a conversation space or designation of a chat device;

(C) a step of storing the received data at an address directly connected to the network or at an address connected to the network via a network-connected chat device; and (D) a step of using the network-connected chat device to notify of the storage location of said data to the designated conversation space or designated chat device.

The invention in this aspect thus yields the same effects as those of the invention in its third aspect.

The invention in an eighth aspect provides a messaging system including chat devices connected to networks sharing conversation spaces set up virtually on the networks for mutually sending and receiving text in a conversational format, and communication devices for communicating via a circuit-switched network with communication terminals connected to the circuit-switched network. The messaging system is provided with a designation means, a storing means and a reporting means.

The designation means, if an incoming message has been detected from a communication terminal, prompts for the designation of a report destination to which data received from the communication terminal is to be reported, and acquires the report destination.

The storing means stores in a predetermined memory device voice data or image data received from the communication terminal.

The reporting means employs a network-connected chat device to report a storage address for the voice data or image data to the report destination.

The messaging system enables conversation with a chat device such as an IRC client. In addition, the messaging device is connected to a circuit-switched network and can communicate with a telephone set or a fax machine on the circuit-switched network. The designation means, in response to an incoming message from a telephone set or a fax machine, requests input of the destination of data that is to be sent. The storing means stores the received data in databases under the administration of a WWW server. The notification means uses the chat device to notify the designated destination of the storage location of the data indicated by URLs.

The foregoing and other objects, features, aspects and advantages of the present invention will become more apparent from the following detailed description in conjunction with the accompanying drawings.

BRIEF DESCRIPTION OF THE DRAWINGS

FIG. 3 is a conceptual explanatory depiction of data stored in a authentication database;

FIG. 4 is a conceptual explanatory depiction of a message table;

DETAILED DESCRIPTION OF THE PREFERRED EMBODIMENTS

Figure 1:
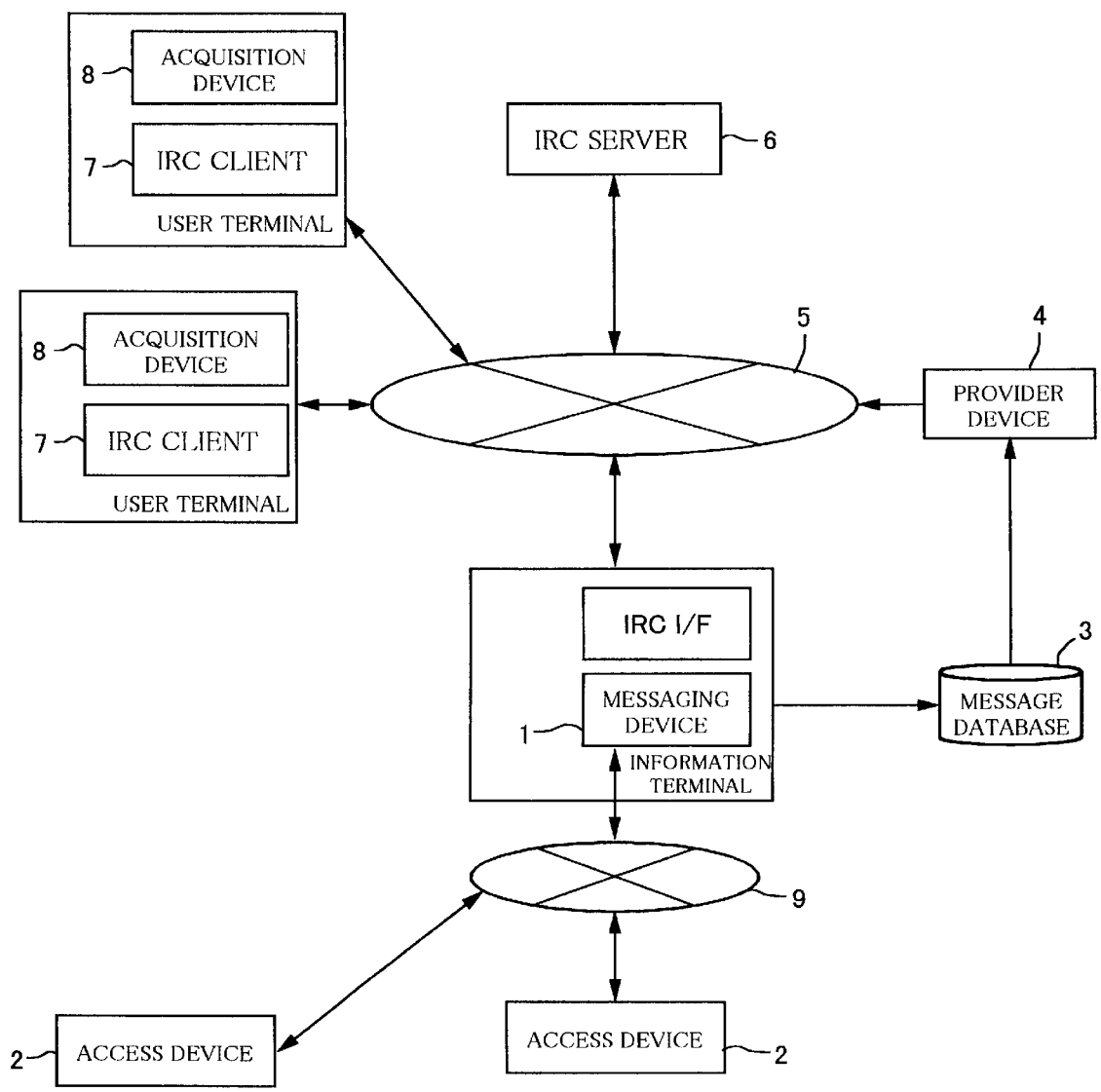
FIG. 1 is an overall block diagram of the configuration of a messaging system according to a first embodiment of the present invention.

The following concretely explains the messaging system according to the present invention, referring to the drawings.

First Embodiment

Overall Configuration

FIG. 1 shows the overall configuration of a messaging system according to a first embodiment of the present invention. To facilitate the explanation, the present embodiment of the present invention takes as an example the case wherein IRC is used as the chat system.

The messaging system according to the present embodiment of the present invention comprises messaging device 1 and message database 3.

Messaging device 1 is provided on an information terminal, and can run together with an IRC interface (hereinafter referred to as I/F). IRC client 7, which constitutes the IRC system discussed below, can be used as the IRC I/F. Messaging device 1 can send and receive messages on the IRC system via the IRC I/F.

In addition, (referring to FIG. 2) messaging device 1 has a communications function, e.g., an application, for connecting to a communication network independent of the Internet 5, as discussed below. Messaging device 1 can connect to an information terminal on the communication network using the communications function. An information terminal on the communication network is indicated by access device 2, which is discussed below. In addition, messaging device 1 can communicate with message database 3. As discussed below, messaging device 1 stores as is in message database 3 the voice data, image data and text data (hereinafter, these are generically referred to as messages) received from access device 2 and reports only the storage location of a message on the IRC system.

Message database 3 stores messages written by messaging device 1. Message database 3 is provided on the Internet 5 or independent of the Internet 5 so that it is accessible by messaging device 1 and provider device 4, discussed below. More specifically, message database 3 may be provided on an information terminal whereon messaging device 1 runs. In addition, although not connected to the Internet 5, it may be provided on an information terminal to which messaging device 1 can connect.

Message database 3 preferably has an ordinary database structure, and is preferably readable by ordinary methods. One example is the construction of a message database 3 that can store voice data as the data under the administration of a WWW server. By constructing message database 3 as an ordinary database, the reading of messages and provision of messages to user terminals can be implemented by systems ordinarily used.

Access device 2, having no function to connect to the Internet 5, and provider device 4 on the Internet 5 are connected to the messaging system. In addition, the information terminal on the Internet 5 is provided with IRC server 6 and IRC client 7, and constitutes the IRC system. The IRC I/F of messaging device 1 is included in this IRC system.

Access device 2 is an information terminal on communication network 9 independent of the Internet 5, and can connect to messaging device 1 via the communication network. Specifically, an information terminal on a telephone circuit network, namely telephone sets or fax machines, can be cited as examples of access device 2. In addition, PCs and WSs (workstations) that are not on the Internet also are examples of access device 2. The following explains a case wherein access device 2 is a telephone set connected to a telephone circuit network or circuit-switched network, and the message is voice data.

Provider device 4 is provided on the Internet 5. Provider device 4 reads a message from message database 3, and can provide it to a user terminal on the Internet 5. A WWW server that provides Web pages on the Internet 5 and a FTP (file transfer protocol) server can be cited as examples of provider device 4. The present embodiment of the present invention takes as an example the case wherein a WWW server is used as provider device 4. Provider device 4 can be provided on an identical information terminal together with messaging device 1, message database 3 and/or IRC server 6.

Acquisition device 8 can be run at the user terminal on which IRC client 7 runs. Acquisition device 8 is for making a request to provider device 4 for the provision of data, and acquiring that data. For example, in the case wherein provider device 4 is a WWW server, the use of a Web browser can be cited as acquisition device 8. The user is notified via IRC client 7 of the storage location of voice data and image data from another user. Subsequently, acquisition device 8 acquires the message stored in the storage location. When the message is voice data, the voice message is output; in cases wherein the message is image data, the image is displayed.

Configuration of Messaging Device

Figure 2:
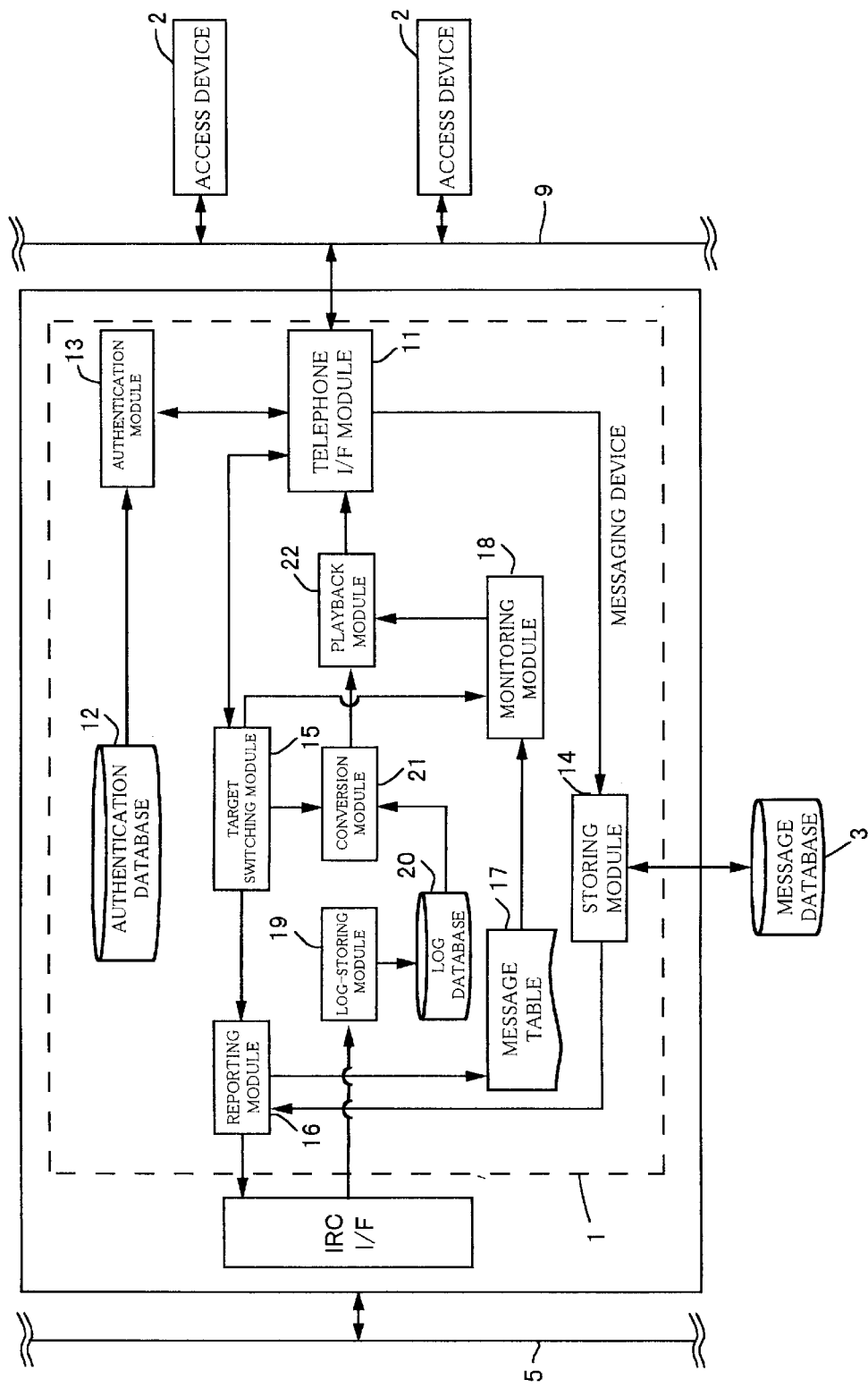
FIG. 2 is a block diagram illustrating functional configuration of the messaging device.

FIG. 2 is a block diagram illustrating functional configuration in the messaging device 1. Messaging device 1 has telephone interface (I/F) module 11, authentication database 12, authentication module 13, saving module 14, target-switching module 15, reporting module 16, message table 17, recorded-message monitoring module 18, message log-storing module 19, log database 20, conversion module 21 and playback module 22. In addition, messaging device 1 can run together with the IRC I/F.

Telephone I/F module 11 establishes a connection with access devices 2 and sends and receives data thereto and therefrom. In addition, telephone I/F module 11 sends and receives data between access devices 2 and authentication module 13, target-switching module 15, conversion module 21, monitoring module 18 and saving module 14.

User authentication information is stored in authentication database 12. Authentication information is information needed for determining whether to allow user access by an access device. An ID number, password, username and the like, and combinations thereof can be cited as examples of authentication information. Authentication information is not limited to text data, and may also be voice data. For example, it is possible to store as authentication information a password or ID number and the like by the voice of a user. This authentication information must be associated with information that can uniquely designate a user on a chat system, and must be stored. In the present embodiment of the present invention, the authentication information is stored associated with the nickname used in the IRC system. A nickname is identification information for uniquely designating an IRC client on an IRC system.

FIG. 3 shows a conceptual explanatory view of the data stored in authentication database 12. The nickname of each user and the authentication information of each user are correlated and stored in authentication database 12. Further a user ID and password are used as the authentication information. Therein, user-voice-input passwords may be stored as the passwords. Additionally, it is also possible to use the network address or communication address of access device 2 as the authentication information. Network addresses are electronic mail addresses or IP addresses, for example. Communication addresses are telephone or fax numbers, for example.

Authentication module 13 makes a request to access device 2 for the input of predetermined authentication information. Authentication module 13 compares the authentication information sent from access device 2 with the authentication information in authentication database 12. Based on the results of the comparison, authentication module 13 determines whether to permit access from the access device. In addition, authentication module 13 notifies telephone I/F module 11 of the nickname of the determined and authenticated user.

Saving module 14 acquires via telephone I/F module 11 the message sent from access device 2, and saves it in message database 3. In the present embodiment, the message from access device 2 is stored as is in a Web page on the Internet 5. Since the stored data is the unaltered voice data sent from access device 2, the nuance that the accessing user wants to convey can be reported to another user as is. Although access device 2 is a telephone set in the present embodiment of the present invention, in cases wherein, for example, access device 2 is a fax machine, saving module 14 saves the sent image data as is. In addition, saving module 14 notifies reporting module 16 of the storage location wherein the message is stored. Specifically, it notifies reporting module 16 of the URL that indicates the location wherein the message is stored.

Target-switching module 15 makes a target designation request to access device 2 via telephone I/F module 11. The target is the channel or the user to which a user who has connected to messaging device 1 by access device 2 (hereinafter, referred to simply as the accessing user) wants to send a message, or the channel in which the accessing user wants to acquire conversation contents. Target-switching module 15 requests input of the nickname of the target channel or target user, or acquires the same via telephone I/F module 11. Target-switching module 15 notifies reporting module 16, monitoring module 18 and, if necessary, conversion module 21 of the inputted target. In addition, target-switching module 15 acquires the nickname of the accessing user from telephone I/F module 11 and notifies reporting module 16 and monitoring module 18.

It should be understood that input into the telephone set of the nickname is carried out using alphanumeric keys. A pre-registered numeric ID is used as a nickname. The following method is conceivable for designating the target channel. If the target channel candidate and number are presented from target-switching module 15 by voice, inputting corresponding alphanumeric keys designates the target channel. Further, by providing target-switching module 15 with a voice recognition function, voice input of nicknames and channel names would be possible.

Via the IRC I/F module the reporting module 16 notifies the target reported from target-switching module 15 of the URL reported from saving module 14. Specifically, if the target is a channel, reporting module 16 sends to the target channel a text message that reports the URL. If the target is a user, reporting module 16 determines whether the target user is connected to IRC server 6. If connected, reporting module 16 via the IRC I/F module notifies the target user of the URL a reporting text message. If the target user is not connected to IRC server 6, reporting module 16 stores the URL in message table 17.

FIG. 4 is a conceptual explanatory illustration of message table 17. The send destination, URL and send source are correlated and stored in message table 17. The target to which the message is to be sent is recorded in the "send destination" column. Specifically, the channel name or nickname of the user is recorded. The URL where the message is stored is recorded in the "URL" column. If message database 3 is furnished in provider device 4 independently of the Internet 5, an address that indicates the storage location of the message is used instead of the URL. An identifier that designates the accessing user is recorded in the "send source" column. The nickname of the accessing user, for example, is conceivable for use as the identifier.

If access device 2 has connected to messaging device 1, monitoring module 18 determines, based on message table 17, whether there is a message to be sent to the accessing user. Specifically, monitoring module 18 searches message table 17 for the send destination, and determines whether a message addressed to the accessing user is stored in the message database. In addition, if the target of the accessing user is a channel, monitoring module 18 determines whether a message addressed to the target channel is stored in the message database. If a message is stored, monitoring module 18 notifies the accessing user to that effect. In accordance with the response from the user, monitoring module 18 reads the message from the message database and sends it to the accessing user.

Log-storing module 19 acquires, via the IRC I/F, messages in each channel. Log-storing module 19 creates a message log for each channel, based on the acquired messages, and stores it in log database 20.

Conversion module 21 retrieves the message log of the target channel reported from target-switching module 15, and converts the text data to voice data. An ordinary text-to-voice data conversion method would be used for this conversion. The converted voice data is sent to playback module 22. If access device 2 is a fax machine or the like, conversion module 21 converts the message log, which is text data, to image data and sends it to telephone I/F module 11. An ordinary text-to-image data conversion method would be used for this conversion.

Playback module 22 plays back the voice based on the voice data from conversion module 21, and sends it to access device 2 via telephone I/F module 11. An ordinary voice synthesis device would be used for voice playback, transmitting the synthesized voice.

Process Flow (1) Main Routine

Figure 5:
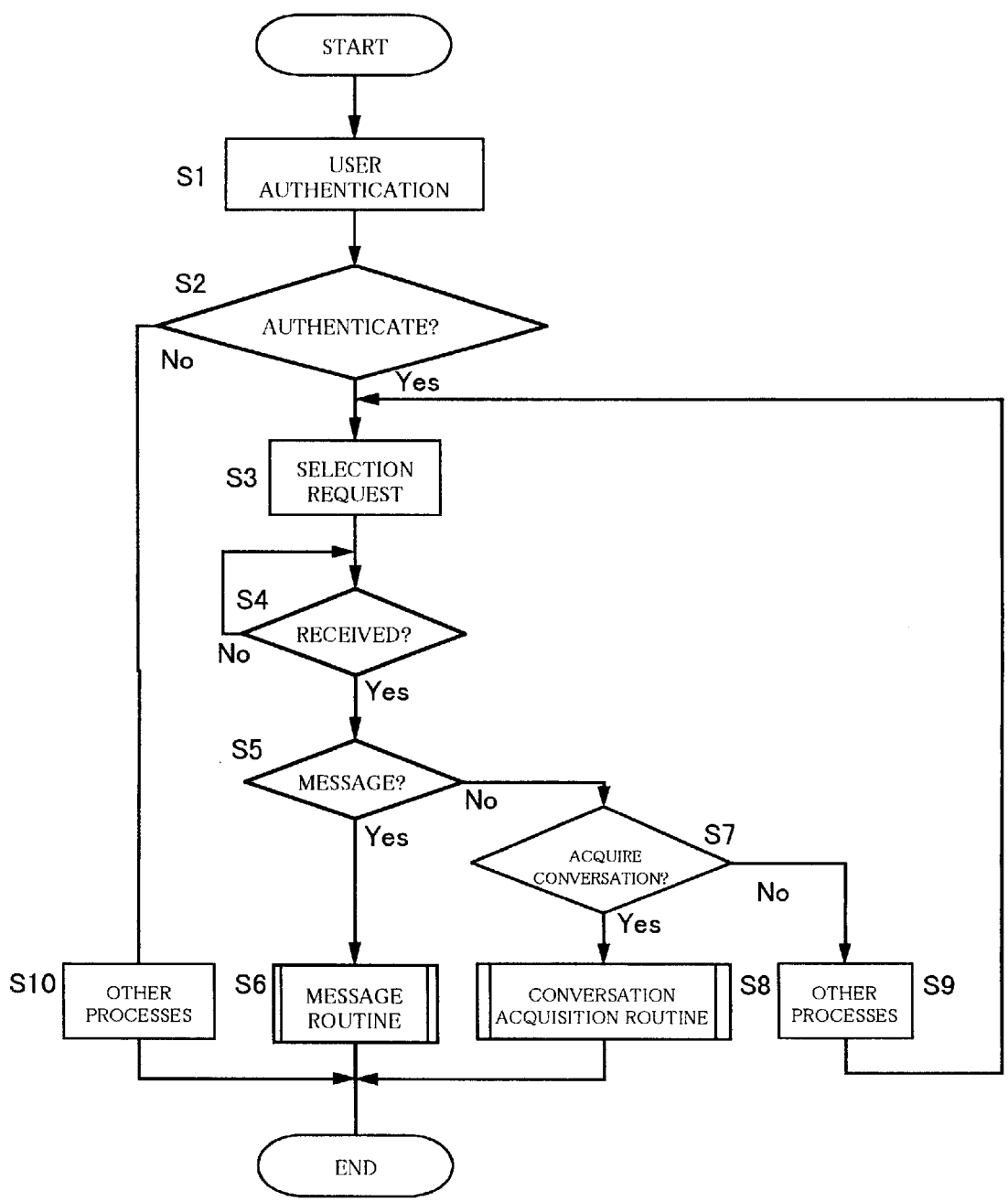
FIG. 5 is a flowchart illustrating main process flow executed by the messaging device.

The following is a concrete explanation of processes executed by messaging device 1 according to the present embodiment of the invention. FIG. 5 is a flowchart illustrating main process flow in messaging device 1. The following processing starts by completing the connection between telephone I/F module 11 and access device 2, for example.

In step S1, authentication module 13 makes a request to access device 2 via telephone I/F module 11 for input of predetermined authentication information. Authentication module 13 waits for the input of the authentication information from access device 2, which it then acquires. Subsequently, authentication module 13 determines, according to authentication database 12, whether to authenticate the user, and sends the authentication results to telephone I/F module 11. In addition, if the user has been authenticated, authentication module 13 sends to telephone I/F module 11 the nickname of the user along with the authentication results. The nickname is read from authentication database 12 using the user ID as the key.

For example, in authentication database 12 in FIG. 3, the user ID and voice password are associated with the nickname of the user, and are stored. Authentication module 13 first makes a request for input of the user ID using a tone signal, and then makes a request for voice input of the password. Authentication module 13 compares the stored voice password corresponding to the inputted user ID with the inputted voice password. If the similarity of both exceeds a threshold value, authentication module 13 permits access. An ordinary voice recognition method can be used for comparing the voice passwords.

In step S2, telephone I/F module 11 determines whether the user was authenticated as a result of the authentication routine. If the user was authenticated, the nickname of the user is reported to target-switching module 15, and step S3 ensues. If the user was not authenticated, step S10 described below ensues.

In step S3, telephone I/F module 11 makes a request to access device 2 for the selection of either a message routine that executes messaging, or a conversation acquisition routine that acquires the conversation on the channel. For example, telephone I/F module 11 sends to access device 2 a predetermined voice message that is prepared in advance. An example of a voice message would be "Please select routine. To leave a message, press #1. To listen to a conversation, press #2."

In step S4, telephone I/F module 11 stands by for the response to the request, and step S5 ensues if a response is received. If a response does not arrive even after standing by for a predetermined time, [telephone I/F module 11] can notify access device 2 to the effect that the connection has been cut, and can terminate the routine.

In step S5, telephone I/F module 11 determines whether the selected routine is the message routine. If the determination is "Yes," step S6 ensues. If the determination is "No," step S7 described below ensues.

In step S6, the message processing subroutine, which is discussed below, is executed. Namely, the message by voice from the accessing user is stored as is in message database 3. The storage location is reported to another user using the IRC system.

In step S7, telephone I/F module 11 determines whether the selected routine is conversation acquisition routine. If the determination is "Yes," step S8 ensues. If the determination is "No," step S9 describe below ensues.

In step S8, the conversation acquisition subroutine, which is described below, is executed. Namely, the conversation contents of the target channel designated by the accessing user is converted from text data to voice data and sent to access device 2.

In step S9, a predetermined voice message such as, for example, "Select correct routine" is sent by telephone I/F module 11, and the process flow returns to step S3.

In step S10, a predetermined voice message such as, for example, "No access rights" is sent by telephone I/F module 11, and the process ends.

(2) Message Routine

Figure 6:
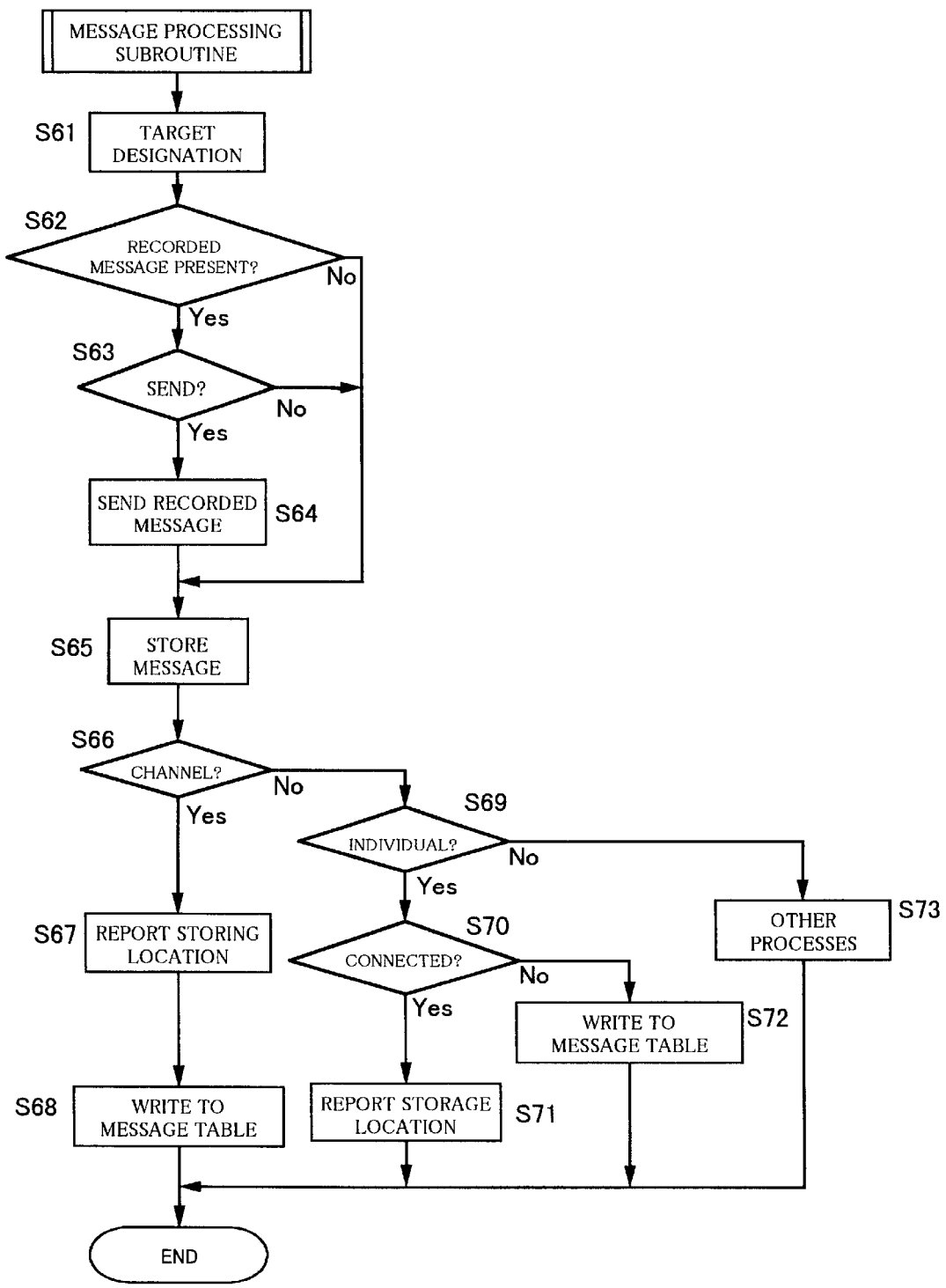
FIG. 6 is a flowchart illustrating process flow in a message processing subroutine executed by the messaging device.

FIG. 6 is a flowchart illustrating process flow in the message routine performed by messaging device 1. If the process flow goes to step S6 in the main routine, the following routine starts.

In step S61, target-switching module 15 makes a request via telephone I/F module 11 to access device 2 for input of the target. Target-switching module 15 waits for the input of the target from access device 2, which it receives and reports to reporting module 16 and monitoring module 18. In addition, target-switching module 15 notifies reporting module 16 and monitoring module 18 of the nickname of the accessing user.

In step S62, monitoring module 18 determines, based on message table 17, whether there is a message addressed to the accessing user in the message database. That is, monitoring module 18 searches message table 17 for a URL wherein the nickname of the accessing user is the destination. If the target is a channel, it also searches for a URL wherein the target channel is the destination. In this case, URLs wherein the accessing user is the send source are excluded from the search target. If there is a URL as a result of the search, step S63 ensues. If there is no relevant URL in message table 17, step S65 described below ensues.

Considering a case wherein "USER-A" connects to messaging device 1 with message table 17 in the state shown in FIG. 4, and further considering that "USER-A" has designated a target for channel #CH1: Even though a message addressed to channel #CH1 is stored in URL1, that message is a message from "USER-A," the user in question. On the other hand, a message addressed to "USER-A" is stored in URL2. In this case, URL2 is the only message to be reported.

In step S63, monitoring module 18 queries access device 2 as to whether to send a message via telephone I/F module 11. For example, the voice data of a predetermined message is stored in advance by monitoring module 18, and the voice message is played back via playback module 22 and sent to access device 2. Monitoring module 18 stands by for a response to the query, and step S64 ensues if the response is "Yes." If "No," step S65 described below ensues. If monitoring module 18 stands by for a response for a predetermined time and a response does not arrive even after the predetermined time elapses, it can also be arranged so that the process flow automatically goes to step S64.

In step S64, monitoring module 18 accesses the URL acquired from message table 17, and acquires the voice data. Furthermore, monitoring module 18 sends the acquired voice data to playback module 22. Playback module 22 plays back the voice from the voice data and sends it to access device 2 via telephone I/F module 11. Furthermore, if a message addressed to a user has been sent, monitoring module 18 should delete from message table 17 the entry of the URL indicating the sent message. In addition, the entry of a message addressed to the channel could be conceivably deleted when a predetermined time elapses.

In step S65, saving module 14 instructs access device 2 via telephone I/F module 11 to input a message. Saving module 14 acquires, in accordance with the instruction, voice data inputted from access device 2, and saves it in message database 3 as is. Furthermore, saving module 14 notifies reporting module 16 of the URL indicating the storage location of the voice data.

In step S66, reporting module 16 determines whether the reported target is a channel. This determination is made based on whether the start character of the target is a "#" or "&." If the determination is "Yes," step S67 ensues. If the determination is "No," step S69 described below ensues.

In step S67, reporting module 16 dispatches to the target channel the URL wherein the message from access device 2 is saved. For example, a predetermined format "PRIVMSG #CH *" that instructs the message is prepared in advance. Therein, "PRIVMSG" is a command designated by the IRC system for dispatching to a channel. The target channel name is recorded in place of "#CH." The URL wherein the nickname of the accessing user and the message are stored is recorded in place of "*." This message is sent from reporting module 16 to the target channel via IRC I/F, and is then distributed in real time to other IRC clients 7 in the channel.

In step S68, reporting module 16 writes to message table 17 the send destination, URL and send source. This is to enable a user not currently participating in that target channel to report a message if the user connects to messaging device 1 through access device 2. The channel name is recorded as the send destination, the nickname of the accessing user is recorded as the send source.

In step S69, reporting module 16 determines whether the target is a specific individual user. Specifically, reporting module 16 determines whether the target is a nickname. This determination is accomplished by determining whether the target is [recorded with] alphanumeric characters. If it determines "Yes," processing transitions to step S70. If it determines "No," processing transitions to step S73, discussed below.

In step S70, reporting module 16 determines whether the relevant user is connected to IRC server 6. This determination is accomplished by querying the chat system server. If it is an IRC system, reporting module 16 sends a "WHOIS NICK" command via the IRC I/F to IRC server 6. In response to this command, IRC server 6 reports, for example, the IRC server to which the relevant user is directly connected, or reports the fact that the relevant user is not connected. If the determination is "Yes" based on the response from IRC server 6, step S71 ensues. If the determination is "No," below described step S72 ensues.

In step S71, reporting module 16 notifies the target user of the URL, as in step S67. That is, since the relevant user is connected to IRC server 6, the URL is reported by a text message on the IRC system. Reporting of the URL is accomplished using a command that can send and receive messages on a one-to-one basis. For example, with an IRC system, a predetermined format "PRIVMSG NICK *" is prepared in advance. Therein, the nickname of the target user is recorded in place of "NICK." "PRIVMSG" and "*" are the same as in step S67. This message is sent from reporting module 16 to the target user in real time via the IRC client and IRC server.

In step S72, reporting module 16 writes to message table 17 the storage location, send destination and send source of the message from access device 2. This is because the URL cannot be reported on the IRC system since the send destination user is not connected to IRC server 6. Therefore, it is arranged so that the message can be reported if the send destination user connects by access device 2.

In step S73, other processes are executed. For example, a process is executed that notifies access device 2 of a predetermined voice message if the message target in step S69 is not a channel and is not a specific user.

In the message routine the storage location of the message sent from the access device is reported to users on the IRC system in real time. By accessing the storage location, the users can view the unprocessed message as is. For example, if the message is a voice message, the voice will be reported as is; if the message is an image message, the image will be reported as is. Accordingly, a message can be sent directly and in real time to a plurality of users, even if not directly connected to the IRC system.

(3) Conversation Acquisition Routine

Figure 7:
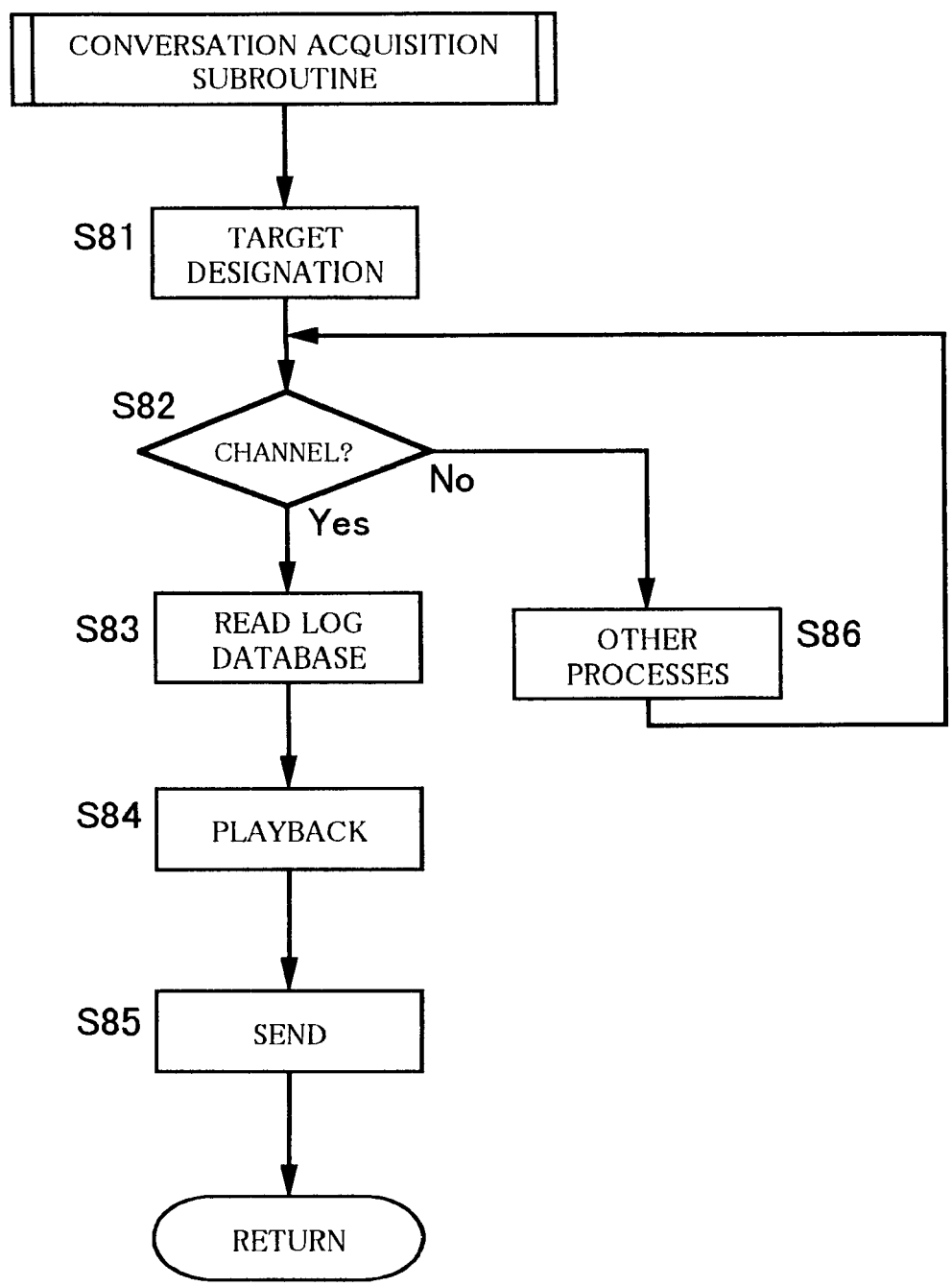
FIG. 7 is a flowchart illustrating process flow in a conversation acquisition subroutine executed by the messaging device.

FIG. 7 is a flowchart illustrating shows process flow in the conversation acquisition routine executed by messaging device 1. If process flow in the main routine goes to step S8, the following processing starts.

First, in step S81, target-switching module 15 makes a request to access device 2 via telephone I/F module 11 for input of the target. Target-switching module 15 waits for the input of the target from access device 2, which it acquires.

In step S82, target-switching module 15 determines whether the target is a channel. If the target is a channel, target-switching module 15 notifies conversion module 21 of the target channel. Subsequently, step S83 ensues. If the target is not a channel, below described step S86 ensues.

In step S83, conversion module 21 reads the message log for the target channel from log database 20, and converts the text data to voice data. The converted message log voice data is sent from conversion module 21 to playback module 22. If access device 2 is a fax machine or the like, conversion module 21 converts the text data to image data, and sends it to telephone I/F module 11.

In step S84, playback module 22 plays back in real time the voice, based on the message log voice data.

In step S85, playback module 22 sends the voice played back via telephone I/F module 11 to access device 2.

In step S86, a predetermined voice message such as, for example, "Please designate channel" is sent out, and the process flow returns to step S82.

In the conversation acquisition routine, a configuration is furthermore conceivable wherein access device 2 is queried regarding how many past hours of the message log to output, and wherein the designated hour range of the message log is converted and sent.

Second Embodiment

The first embodiment of the present invention described an instance wherein access device 2 is a telephone set. However, access device 2 is not limited to a telephone set. Moreover, various types of access devices 2 could conceivably be connected to messaging device 1. In such a case, access device 2 type would preferably be stored in message table 17 in addition to the send destination, URL, and send source.

Access device 2 type indicates telephone set, fax machine, etc. The type of access device 2 distinguishes the data type of the message so that the data may be suitably converted. For example, if the message is voice data, the voice must be played back via playback module 22; however, if it is image data, the data read from the message database can be sent as is to the access device.

Furthermore, as the information stored in message table 17, it is also possible to maintain access time and date, and communication addresses for access devices 2. Conceivably user convenience could also be improved by notifying access device 2 of this information together with the message.

Third Embodiment

The first embodiment of the present invention described a configuration wherein the message log of each channel could be acquired from access device 2. However, if the message log need not be acquired, log-storing module 19, log database 20 and conversion module 21 need not be provided.

Fourth Embodiment

The first embodiment of the present invention described an example using a voice password and user ID for user authentication. However, the user authentication method is not limited to the foregoing method, and various methods are possible. For example, voice usernames and voice passwords could conceivably be used as the authentication information. Authentication module 13 makes a request to access device 2 for the voice input of the username and password, and determines whether to permit access by whether the level of similarity of the two exceeds a threshold value.

Employing the present invention enables a user, even if the user is in the field—on a business trip or otherwise on the go—and cannot directly connect to a chat system such as an IRC system, directly and in real time to send messages to a plurality of other users on the chat system.

Various details of the present invention may be changed without departing from its spirit nor its scope. Furthermore, the foregoing description of the embodiments according to the present invention is provided for illustration only, and not for the purpose of limiting the invention as defined by the appended claims and their equivalents.

What is claimed is:

1. A messaging method for use in a chat system comprising chat devices connected to networks sharing conversation spaces set up virtually on the networks, for mutually sending and receiving text in a conversational format, said messaging method comprising:

receiving from an information terminal independent of the chat devices via another network independent of the chat system networks, communication data and data designating a conversation space or designating a chat device;

storing the received communication data; and reporting via the chat system networks a storage address for the received communication data to the designated virtual space or the designated chat device on the chat system networks.

2. A messaging system for use together with a chat system comprising chat devices connected to networks sharing conversation spaces set up virtually on the networks, for mutually sending and receiving text in a conversational format, the messaging system comprising:

a storage means directly connected to said chat system networks or connected to the chat system networks via a network-connected chat device and storing data;

a second information terminal receiving, from a first information terminal independent of the chat devices via another network independent of the chat system networks, communication data and data designating a conversation space or designating a chat device on the chat system networks;

storing the received communication data in said storage means; and reporting via the chat system networks a storage address for the received communication data to the designated conversation space or designated chat device.

3. A messaging device for use together with a chat system comprising chat devices connected to networks sharing conversation spaces set up virtually on the networks, for mutually sending and receiving text in a conversational format, said messaging device comprising:

external communication means for receiving from one information terminal independent of the chat devices via another network independent of the chat system networks, voice data, text data and image data;

target switching means for receiving from the one information terminal independent of the chat devices via the other network designation of a conversation space or designation of a chat device on the chat system networks;

storing means for storing the received data at an address directly connected to the chat system networks or at an address connected to the chat system networks via a network-connected chat device; and reporting means for reporting via the chat system networks a storage address of the received data to the designated conversation space or the designated chat device on the chat system networks.

4. The messaging device according to claim 3, further comprising:

authentication information storage means for storing predetermined authentication information per user; and authentication means for authenticating a user by making a request to the one information terminal for input of predetermined authentication information and comparing the input authentication information to the stored authentication information.

5. The messaging device according to claim 3, further comprising:

message storage means for storing for each conversation space a message history of the conversation space;

conversation acquisition means for acquiring messages in the conversation space from the chat device and storing the messages in said message storage means; and conversion means for acquiring from said message storage means, if said target switching means has received a virtual space designation from the one information terminal via the other network, the message history of the designated conversation space and converting the message history into a format suited for transmission via the other network to the one information terminal.

6. The messaging device according to claim 3, further comprising:

a message table wherein send destination, send source and storage address for the received data are correlated and stored;

recorded message monitoring means for, if a conversation space is designated by the one information terminal as a first type terminal, determining based on said message table whether data from another chat device addressed to the designated conversation space via the chat system networks has been stored, and for determining based on said message table whether data from another first type terminal addressed to the one information terminal via the other network has been stored; and recorded message reporting means for sending, according to the determination results, the data from the other first type terminal and the other chat device to the one information terminal via the other network.

7. A computer readable recording medium storing at least one program controlling a messaging system for use with chat devices connected to chat system networks sharing conversation spaces set up virtually on the networks, for mutually sending and receiving text in a conversational format, according to a process of:

receiving from a first information terminal independent of the chat devices via another network independent of the chat system networks, voice data, text data or image data;

receiving from the first information terminal independent of the chat devices via the other network designation of a conversation space or designation of a chat device on the chat system networks;

storing the received data at an address directly connected to the chat system networks or at an address connected to the chat system networks via a network-connected chat device; and using the chat system networks or the network-connected chat device to notify via the chat system networks the storage location of said received data to the designated conversation space or the designated chat device on the chat system networks.

8. A messaging system in communication with chat devices connected to chat system networks sharing conversation spaces set up virtually on the chat system networks for mutually sending and receiving text in a conversational format, and in communication with communication terminals independent of the chat devices and communicating via a circuit-switched network independent of the chat system networks, the messaging system comprising:

a designation unit prompting, if an incoming message including voice data, text data or image data has been detected from one of the communication terminals independent of the chat devices via the circuit-switched network independent of the chat system networks, for the designation of a report destination on the chat system networks to which data received from the communication terminal is to be reported, and for acquiring the report destination;

a storage unit storing the voice data, text data or image data received from the communication terminal in a predetermined memory device; and a reporting unit reporting to the report destination via the chat system networks a storage address for the stored voice data, text data, or image data.

* * * * *